Dec. 6, 1955

W. F. HAGEN 2,725,907

DISC CUTTER

Filed Nov. 17, 1954

WILLIAM F. HAGEN
*INVENTOR.*

BY

United States Patent Office 2,725,907
Patented Dec. 6, 1955

2,725,907

DISC CUTTER

William F. Hagen, East Orange, N. J.

Application November 17, 1954, Serial No. 469,353

3 Claims. (Cl. 144—118)

This invention relates to cutters for use on machines known as sanders or cutters used normally in cutting or smoothing wood, plastic, soft metal objects or the like, such as in pattern shops, etc.

Rotary sanders or cutters utilizing rotary discs having abrasive discs of sand paper, garnet paper or like abrasives are commonly used in pattern shops, by hobbyists etc. for finishing and often forming articles of various materials such as wood, plastic, soft metal or the like. Such machines provide accurate, quick and easy working of the material and result in substantial savings in labor and time. However, the abrasive surfaces of such discs, being what is commonly known as sand paper, wear rapidly, become clogged with pitch, and otherwise rendered unusable after short periods of use, requiring frequent changing of the abrasive discs, with loss of operating time of the machine, labor costs of replacement of abrasive discs together with the cost of the numerous abrasive discs required.

An object of the present invention is to provide a cutter which will perform all of the functions of the abrasive discs used on such machines in at least a satisfactorily equal manner, and which while the initial cost thereof may be slightly in excess of the cost of each abrasive disc such as now in use, will outlast many such abrasive members and thereby more than compensate for any increase in initial cost over the types of abrasive members now in use.

Further the present invention provides a cutting disc employing a plurality of saw blades, such as hack saw blades, sections of band saw blades or the like, the teeth of which project slightly from the face of a carrying disc to cut the material worked upon, as well as novel means for quickly, easily and economically attaching the saw blades to the disc in approximately radial positions of the disc but in actuality extending across the face of the disc tangentially of a circle of predetermined diameter and concentric of the axis of the carrying disc, thereby positioning the teeth of the successive saw blades out of line one with another to prevent forming of fine grooves in the surface being worked upon.

With these and other objects in view, as may appear from the accompanying specification, the invention consists of various features of construction and combination of parts, which will be first described in connection with the accompanying drawings, show a disc cutter of a preferred form embodying the invention and the features forming the invention will be specifically pointed out in the claims.

Figures 1, 2, 3, 4, 5, 6:
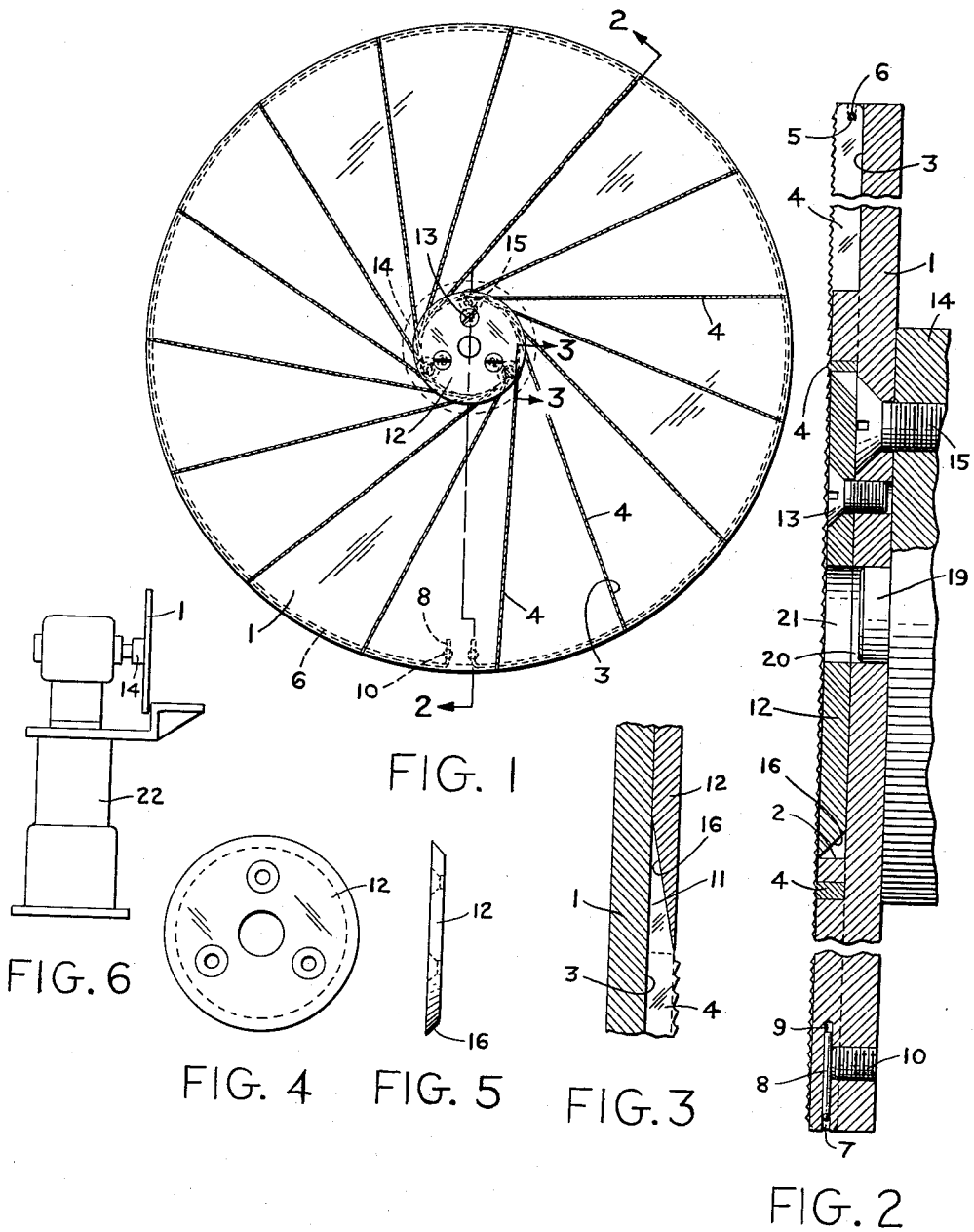
Figure 1 is a plan view of the improved cutting disc.
Figure 2 is a cross-section through the cutting disc, taken on the line 2—2 of Figure 1.
Figure 3 is a detail section taken on the line 3—3 of Figure 1.
Figure 4 is a plan view of a blade attaching disc used in the cutting disc structure.
Figure 5 is an edge view of the attaching disc.
Figure 6 is a view showing the cutting disc applied to a machine on which it is applicable for use.

Referring more particularly to the drawings the improved disc cutter comprises a flat carrying disc 1 having a circular recess 2 of predetermined diameter cut in its outer face concentric of the axis of the disc 1 and with a plurality of grooves 3 cut in its outer face extending tangentially of the perimeter of the recess 2 and radiating therefrom outwardly to the perimeter of the carrying disc 1 as clearly shown in Figure 1 of the drawings. Saw blades 4, are inserted in the grooves 3 and are of such length and the grooves 3 are so arranged that each blade overlaps the inner end of an adjacent blade so as to provide complete cutting surfaces to within a short distance of the axis of the disc, and by extending the saw blades tangentially to the circumference of the circular recess 3 the teeth of the blades will be arranged so that they will cover or engage the entire surface of the material worked upon in staggered relationship one to another and prevent the forming of grooves in the surface of the material worked upon, providing a smooth finished surface. The teeth of the saw blades 3 protrude from the flat outer face of the carrying disc 1 and to provide the best results it has been found that the teeth should protrude approximately .10 to .015 inch beyond the outer surface of the face of the carrier disc 1 and wherever the term "slightly" is used in the specification and claims it is to be understood it means approximately these distances. The saw blades 3 may be conventional hack saw blades, sections of band saw blades or the like and each of them has a hole 5 therethrough near its outer end through which a wire 6 extends. The carrying disc 1 has an annular groove 7 in its perimeter in which the wire 6 rests. The ends 8 of the wire 6 extend into holes 9 formed substantially radially in the disc 1 and are tightly held therein by means of set screws 10, to removably connect the outer ends of the saw blades 4 to the carrying disc 1. The inner ends of the saw blades 4 are beveled as shown at 11 in Figure 3 of the drawings and are clamped in position in their respective grooves by a clamping disc 12 which is attached by suitable machine screws 13 to the carrying disc 1. The elongated beveling of the inner ends of the saw blades is occasioned by the fact that they extend tangentially to the circumference of the attaching disc 12 and recess 3. The attaching disc 1 is attached to a hub 14 by machine screws 15, the heads of which are countersunk into the carrying disc 1. The machine screws 15 are so located that their heads are embraced in the recess 3 and are covered by the clamping disc 12 when the latter is in saw blade clamping position in the recess 3, thus the outer face of the carrying disc 1 is free from any projections excepting only the teeth of the saw blades 4.

The perimeter of the clamping disc 12 is beveled as shown at 16 to snugly fit and clamp against the inner beveled ends of the saw blades 4.

The hub 14 has a locating pin 19 formed thereon which engages in locating openings 20 and 21 formed in the carrying disc 1 and clamping disc 12 respectively for properly locating the hub and discs when assembling the disc cutter. The hub 14 may be of any suitable construction to permit attachment of the cutter disc to a sanding or grinding machine of standard construction such as generically shown at 22 in Figure 6 of the drawings.

The saw blades may be easily and quickly replaced when they become worn by simply detaching the clamping disc 12, releasing the ends of the holding wire 6 from the holes 9 and unthreading the worn blades from the wire, after which new blades are threaded upon the wire, the wire placed in its groove and the blades placed in the grooves 3. The ends of the wire are then fixed in the holes 9 by the set screws 10 and the clamping disc 12 is attached to the carrying disc 1.

The disc cutter above described is applicable for use on standard sanding or grinding machines, and is mounted thereon by means of the hub 14.

It will be understood that the invention is not to be limited to the specific construction or arrangement of parts shown, but that they may be modified within the invention defined by the claims.

What is claimed is:

1. A cutter disc for use on a sanding or grinding machine including a carrying disc having a flat outer working surface and provided with a circular recess in its outer surface concentric with the axis of the carrying disc, said carrying disc being provided with a plurality of grooves cut in its outer surface with their inner ends extending tangentially of the circumference of said recess and the grooves radiating outwardly from the recess to the perimeter of the carrying disc, a plurality of saw blades seated in said grooves with their teeth projecting slightly from the outer face of the carrying disc with the inner end of each blade overlapping the inner ends of adjacent blades, means seated in said circular recess for holding the inner ends of the saw blades in position in the grooves, and means engaging the outer ends of the saw blades and the perimeter of said carrying disc to hold the saw blades in the grooves constituting openings through the blades near their outer ends, a wire threaded through the holes in all of said blades, said carrying disc provided with an annular groove in its perimeter in which said wire is seated, said carrying disc provided with at least one approximately radial hole opening into said annular groove, and receiving the ends of said wire, and means for preventing accidental removal of the wire ends from said hole.

2. A cutter disc as claimed in claim 1, wherein said saw blades have their inner ends beveled and said holding means for the inner ends of said saw blades constitutes a flat clamping disc having a beveled perimeter for engagement with the inner beveled ends of the saw blades, and means for attaching said clamping disc to said carrying disc.

3. A cutter disc for use on a sanding or grinding machine including a carrying disc having a flat outer working surface and provided with a circular recess in its outer surface concentric with the axis of the carrying disc, said carrying disc being provided with a plurality of grooves cut in its outer surface with their inner ends extending tangentially of the circumference of said recess and the grooves radiating outwardly from the recess to the perimeter of the carrying disc, a plurality of saw blades seated in said grooves with their teeth projecting slightly from the outer face of the carrying disc with the inner end of each blade overlapping the inner ends of adjacent blades, means seated in said circular recess for holding the inner ends of the saw blades in position in the grooves, and means engaging the outer ends of the saw blades and the perimeter of said carrying disc to hold the saw blades in the grooves, said saw blades having their inner ends beveled and said holding means for the inner ends of said saw blades constituting a flat clamping disc having a beveled perimeter for engagement with the inner beveled ends of the saw blade, and means for attaching said clamping disc to said carrying disc.

References Cited in the file of this patent

UNITED STATES PATENTS

| | | |
|---|---|---|
| 760,095 | Archdearon | May 17, 1904 |
| 943,046 | Schleicher | Dec. 14, 1909 |
| 943,102 | Schleicher | Dec. 14, 1909 |
| 1,387,027 | Watrons | Aug. 9, 1921 |
| 1,576,645 | Eskew et al. | Mar. 16, 1926 |
| 1,829,531 | Neilsen | Oct. 27, 1931 |
| 2,703,119 | Pullen | Mar. 1, 1955 |